(12) United States Patent  
Burmester

(10) Patent No.: US 7,198,058 B2  
(45) Date of Patent: Apr. 3, 2007

(54) DEVICE FOR ACTUATING DOUBLE SEAT VALVES

(75) Inventor: Jens Burmester, Grambek (DE)

(73) Assignee: Tuchenhagen GmbH, Buchen (DE)

( * ) Notice: Subject to any disclaimer, the term of this patent is extended or adjusted under 35 U.S.C. 154(b) by 163 days.

(21) Appl. No.: 10/524,744

(22) PCT Filed: May 26, 2003

(86) PCT No.: PCT/EP03/05508

§ 371 (c)(1),  
(2), (4) Date: Feb. 11, 2005

(87) PCT Pub. No.: WO2004/023009

PCT Pub. Date: Mar. 18, 2004

(65) Prior Publication Data

US 2005/0247343 A1   Nov. 10, 2005

(30) Foreign Application Priority Data

Aug. 14, 2002 (DE) ............................... 102 37 236

(51) Int. Cl.  
*F16K 1/44* (2006.01)

(52) U.S. Cl. .............. 137/312; 137/240; 137/614.17; 137/614.18; 137/614.19

(58) Field of Classification Search ............... 137/312, 137/240, 614.18, 614.19, 614.17  
See application file for complete search history.

(56) References Cited

U.S. PATENT DOCUMENTS 4,605,035 A * 8/1986 Rasmussen et al. ........ 137/240

5,645,102 A * 7/1997 Brackelmann et al. ...... 137/312  
6,014,983 A * 1/2000 Sondergaard et al. ....... 137/312

FOREIGN PATENT DOCUMENTS

| DE | 31 33273 | 3/1983 |
|---|---|---|
| DE | 31 08973 | 8/1987 |
| DE | 199 00 239 | 6/2000 |
| EP | 0 868 619 | 11/1996 |
| WO | 01/81228 A1 | 9/2001 |

* cited by examiner

*Primary Examiner*—Kevin Lee  
(74) *Attorney, Agent, or Firm*—Vidas, Arrett & Steinkraus, P.A.

(57) ABSTRACT

The invention relates to a device for actuating double seat valves, which are especially suitable for the food and beverage industry and which have an independently actuated first closing element (3) and a second closing element (4) actuated dependently on it, whereby the actuation (100, 200) always shows via a main adjustment device (100) for the full open position (H) as well as, for the case of maximum requirements, the respective individual adjustment devices (200; 200.1, 200.2) which are assigned to the closing elements (3, 4) for generation of the partially open positions (T1, T2) for the seat cleaning of the closing elements (3, 4). The object of the invention is to design a device according to this generic type, that is constructed as simply as possible and that the first partially open position (T1) of the independently actuated closing element (3) is adjustable from the outside of the device. This is achieved in that a stop position of the second actuating piston (205) relative to the housing (201/202) provided for the first partially open position (T1) of the first closing element (3) of the individual adjustment device (200) and is adjustable from its exterior in the area between the main adjustment device (100) and the individual adjustment devices (200) through a stop nut (214).

16 Claims, 6 Drawing Sheets

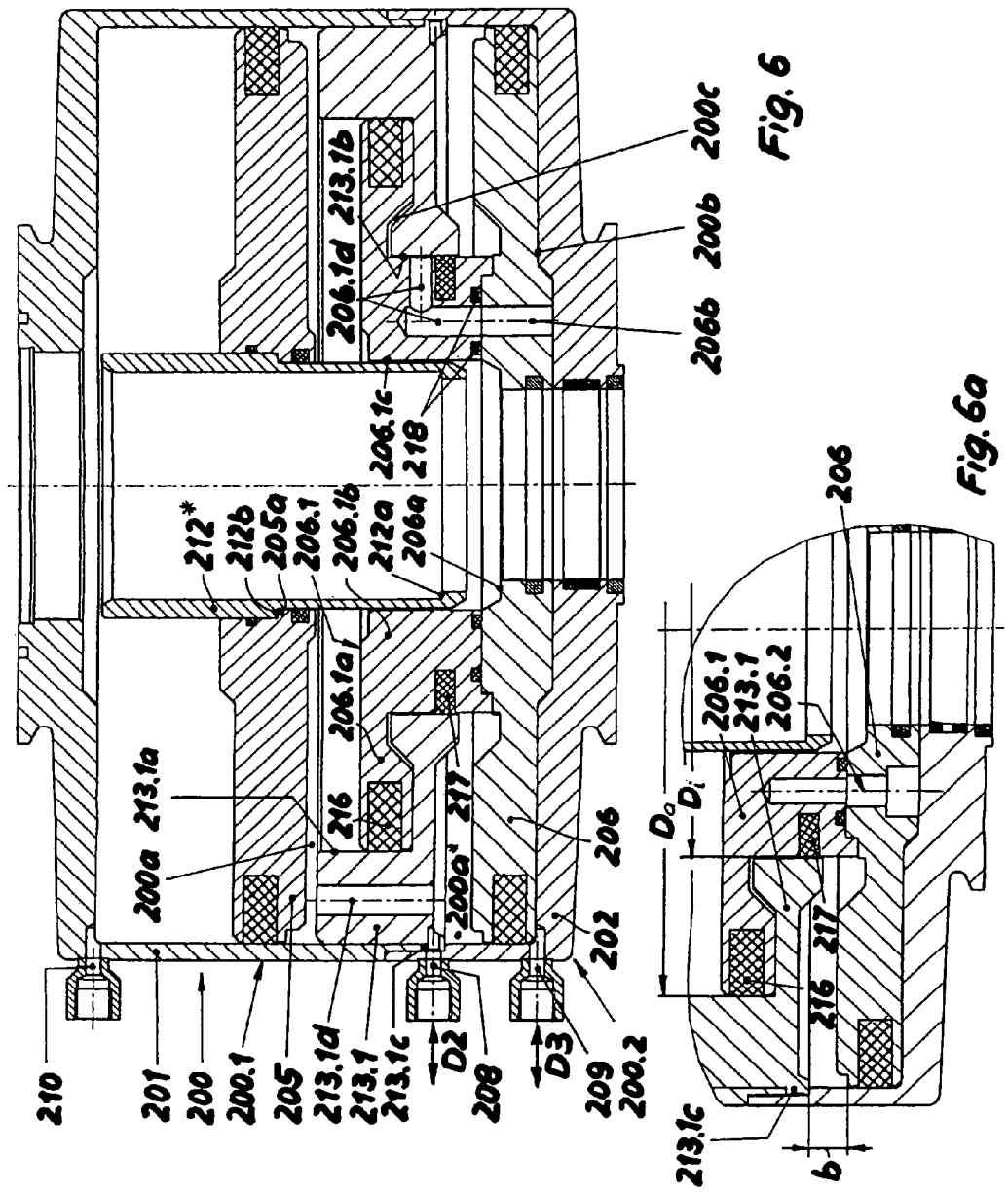

DEVICE FOR ACTUATING DOUBLE SEAT VALVES

CROSS-REFERENCE TO RELATED APPLICATIONS

Not Applicable

STATEMENT REGARDING FEDERALLY SPONSORED RESEARCH

Not Applicable

BACKGROUND OF THE INVENTION

A device according to this generic type is known from DE 31 33 273 C2. With this device the individual adjustment devices are to be additively inserted between the main adjustment device and a lantern housing below the main adjustment device, which solely generates the full stroke for the full open position as a stand-alone adjustment device without changing the neighboring standard members. These achievable advantages using this so-called "modular" actuator concept consist particularly in that to the greatest possible extent a standardized double seat valve, which has a standard actuator available for the generation of the full open position, through additive insertion of relatively simple individual adjustment devices acquires special functions, such as the generation of partially open positions of both closing elements. Here the text explicitly shows that the stroke limit for both of the partially open positions is achieved by permanent stops. In this connection it is further proposed to make the stroke limit using an intermediate ring which is located between the pistons causing the opening movement and the permanent stops assigned to each of them. Furthermore it is proposed, without illustrating and describing a definite solution here, to make the necessary stoke limit using stops axially movable within limits from outside of the adjustment device for the partially open positions.

With the preceding briefly defined double seat valve with permanent stops for the partially open position a disadvantage has emerged, that the stops are not able to be modified axially within limits. Therefore in practice the situation can arise that at the initial startup of the double seat valve both of the partially open positions turn out to be either too small or too large. This result is dependent on which total tolerance results from the sum of the individual tolerances of the participating members of the double seat valve for the implementation of the partially open positions. An insufficient partially open position leads to an insufficient seat cleaning or no seat cleaning at all; the latter then when the partially open position moves into the range of the elastically reshaping seat seal of the concerned closing element. A partially open position which is too large constantly leads to an unnecessary high consumption of cleaning solution and under these conditions the danger exists, especially on the independently actuated closing member, that the remaining annular gap passage after the execution of the partially open position between the two closing elements is measured too small in order to discharge the cleaning solution flow, which is introduced by the seat cleaning over the exposed seat surface of the independently actuated closing element from the assigned valve housing member as unpressurized as possible, as is required for safety reasons. In the worst case the annular ring passage does not even materialize and the two closing elements collide with each other.

From the realization that the individual members cannot be so closely toleranced that the total tolerance which inevitably results remains without a disadvantageous influence on the desired partially open position, up to now as a rule the necessity arose with the previously named known double seat valve to adjust the permanent stops on each resulting actual situation. This resulted preferably in that the intermediate rings between the piston and the permanent stop were each constructed and installed with the exact required axial dimension. This type of adjustment of the actuator of the double seat valve is complex and therefore expensive, since the double seat valve must first be completely assembled in order to establish the actual situation, and afterwards must be partially disassembled in order to install the proper intermediate rings and finally again be reassembled. Modifications to the partially open positions by differing operating conditions and/or wear of the members can only be compensated for, looked at over the service life of the double seat valve, through repetitions at time intervals of the previously described procedure.

The necessity arises from the last-mentioned disadvantage with a double seat valve of the type in discussion to make at least the critical partially open position, namely that of the independently actuated closing element, as simple to adjust as possible, preferably from the outside. The DE 31 33 273 C2 describes no definite solutions for this; at best inadequate recommendations are found there.

In DE 31 08 973 C2 a control device for double seat valves is described with which the stop position of the pistons is adjustable, for generation of the partially open position relative to the control rod. The modification can thereby be done from outside of the individual adjustment devices using control features. But the possibility for adjustability is paid for in that both control rods are guided through the main adjustment device upwards and end in a control cylinder common to both closing elements. The disadvantage of this arrangement is that both control rods must be designed relatively long and therefore structurally critical since they, starting from the closing elements in the valve housing, must penetrate or by pass the lantern housing, the main adjustment device and the individual adjustment devices. The necessary accessibility of the control feature of the individual adjustment device adjacent to the main adjustment device requires there an additional lantern housing, which raises the overall height of the total arrangement. A further disadvantage is that the arrangement of a control head on the end of the control device, which in the highest stage of extension monitors among other things the path of motion and the discrete end position of the closing element and takes over the entire control logic as well as the pilot valves for the activation of the adjustment devices with pressurizing medium, is not possible without eliminating the accessibility of the control features arranged there.

From EP 0 868 619 B1 a device for actuating double seat valves of the type in discussion is known which, along with a main adjustment device, has two individual adjustment devices for the implementation of the two partially open positions. All adjustment devices are placed in a common actuator housing, whereby the two individual adjustment devices are located between the main adjustment device and a lantern housing adjacent to the valve housing. This arrangement has the advantage, just as one according to DE 31 33 273 C2, that the control rod of the dependently actuated closing element can end already in the assigned individual adjustment device and that the control rod of the independently actuated closing element is only guided through the main adjustment device into the control head as needed.

In addition each of the provided stop positions of the pistons for the partial stroke limit of the closing element relative to each control rod on it is able to be modified from the exterior of the actuator device in the area of the lantern housing. Stop sleeves which penetrate each other in the axial direction are provided as control features through which the control rods, which are located concentrically to each other, are guided through, whereby the outer stop sleeve in the actuator housing and the inner stop sleeve in the outer one are each arranged to be adjustable and fixable.

The preceding briefly described actuator is also designated in expert circles as a so-called "integrated" actuator, because in a common housing it accommodates the main adjustment device for the full opening stroke H as well as the individual adjustment devices for the partially open positions T1 and T2. These types of actuators are as a rule compactly built and make it possible to arrange a so-called control module and/or control head directly above the main adjustment device, if the individual adjustment devices are arranged in the previously described manner in reference to the main adjustment device. A further advantage results from the adjustability of the partially open positions from the outside, although the proposed solution in this regard is very complex.

The significant disadvantages of the integrated actuators also arise from the fact that they are designed for the maximum requirements which are placed on double seat valves of the type under discussion. Maximum requirements are then given if, along with the full opening stroke H which is executed by the main adjustment device, the partially open positions T1, T2 of both closing elements for the execution of the respective seat cleaning, which is carried out by an individual adjustment device assigned to each closing element, are necessary. Since a large percentage of the double seat valves placed in installations in the food and beverage industry are in applications without the possibility or necessity of seat cleaning, because only mixing efficiency is required, integrated actuators in which only the main adjustment device is activated are normally too complex and therefore uneconomical. In practice these types of applications then fall back on "normal" actuators (standard actuators) for double seat valves, which only accommodate a main adjustment device for the full open position H. Thereby the quantity of integrated actuators from a manufacturer of double seat valves is reduced, since each double seat valve corresponding to the requested requirements is only equipped with a suitable actuator for this purpose and thereby results as the case may be in uneconomical manufactured quantities for integrated actuators.

The dependently actuated closing element of the double seat valve, which with its two seals is also designated as a double disk, is in fact not critical during the seat cleaning in regards to its partially open position T2 and therefore can be moved against a permanent stop for the execution of the assigned seat cleaning position. This stop therefore needs no complex pre-adjustment or readjustment. During seat cleaning the cleaning solution is normally under pressure on the dependently actuated closing element, so that this must be opened by the partial stroke T2 against the resulting closing force from the corresponding pressure and the assigned operative surface of this closing element. To overcome this closing force or holding down force the assigned second individual adjustment device is to be dimensioned accordingly. Either a sufficiently large piston surface of the actuating piston in this second individual adjustment device is to be provided or the pressure of the pressurizing medium loaded on the actuating piston is to be correspondingly increased if there are restrictions in regards to the diameter dimension of the actuating piston. An adjustment of the actuator to the existing pressure conditions using a corresponding dimensioning of the actuating piston is always primarily a question of cost and is normally only chosen if other possibilities are not available. The choice of a higher pressure of the pressurizing medium is normally preferred; however in practice it is always eliminated if the installation or plant in which the cleanable double seat valve is installed does not have available a pressure level in this regard or out of cost considerations can not be additionally done.

The object of the present invention is to design a device according to this generic type that is constructed as simply as possible and that the partially open position of the independently actuated closing element is adjustable from the outside of the device.

Furthermore in the scope of an advantageous embodiment of the proposed device, a larger flexibility should be ensured in the adjustment of the second individual adjustment device for the partial stroke movement of the dependently actuated closing element to the available pressure of the pressurized medium.

SUMMARY OF THE INVENTION

An important advantage of the proposed solution lies in that for the first time a solution is disclosed on how, with a modular actuator concept in which the main adjustment device has a standard actuator and the individual adjustment devices are independently designed and are inserted between the standard actuator and the valve housing or a lantern housing connected with it, the (critical) partially open position of the independently actuated closing element is adjustable from the outside of the device.

For that reason henceforth it is possible to equip double seat valves which are capable of seat cleaning and those which are not capable of seat cleaning with the same standard actuator for the full opening movement of the valve. Thus on the one hand the best conditions for an economic quantity of production pieces of this type of standard actuators prevail and on the other hand for each double seat valve only the necessary corresponding actuator parts are used. In addition the critical partially open position of the independently actuated closing element is adjusted from the outside of the device from case to case depending on the given total tolerance of the participating elements. The less critical partially open position of the dependently actuated closing element is controllable by a permanent stop, since the members participating in the occurring partially open position can be toleranced so that the added total tolerance has a subordinate influence on the necessary partially open position.

Furthermore the proposal makes possible the implementation of special functions, namely the execution of the partial stroke movement T1, T2 of both closing elements for the purpose of their seat cleaning by means of stand-alone individual adjustment devices, economically justifiable for the initial equipment of double seat valves, as well as for the refitting of already available double seat valves, which were previously normal switching, however capable of seat cleaning.

The insertion of stand-alone individual adjustment devices in a relatively complex structure, as is demonstrated in a double seat valve, is therefore possible because the individual members are as far as is possible normed or standardized in their connections and joints within the scope of a modular system. This is true for the main adjustment device (standard actuator) as well as for the lantern housing adjacent to the valve housing and the control rods passing through from the upper valve housing member. The housing connection is preferably done using standardized so-called clamping ring connections and the control rods are screwed together at the corresponding locations. Due to the location of the individual adjustment devices between the main adjustment device and the valve housing, the other side of the main adjustment device remains free for the arrangement of a control device, which among other things monitors the path of motion and the discrete end locations of the closing elements and takes over the entire control logic as well as the pilot valve.

An advantageous embodiment is designed considering an execution of the partial stroke limit of the independently actuated first closing element as simply as possible and accessible from the outside of the device, to determine the stop position of the second actuating piston for the first partially open position T1 indirectly over a drive sleeve, which is supported and sealed on the one side in the second actuating piston and on the other side to a guide component, which engages from outside in the third housing member of the individual adjustment devices as a separate member and complementary supplements this. The drive sleeve thereby finds its stops on the stop nut which is located on the guide component and is accessible from the outside and adjustable and fixable. The location of the guide component enables this to be pulled so far out of the third housing member of the individual adjustment device until the stop nut is accessible. The adjustment of the stop nut is preferably done using a threaded connection with fine threads, specifically for example a grub screw. The access to the guide component is thus possible in a simple manner in that the clamping ring connection between the main adjustment device and the individual adjustment devices is detached and all of the members directly or indirectly connected with the first actuator stem of the main adjustment device are pulled out from the third housing member of the individual adjustment devices by the necessary axial distance.

The preceding mentioned ability for extension of the members which come into question arises from a further advantageous embodiment, which provides for the arrangement, made up of a guide component in connection with the stop nut, the drive sleeve, the second actuator stem in connection with the lock nut, a third actuator stem and a second spring located between the latter and the second actuator stem, is able to be totally extended from the assembled individual adjustment devices in the direction of the main adjustment device which is able to be flanged on the latter.

In order to ensure the most delay free response of the first individual adjustment device as possible after its activation with pressurizing medium, a further proposal allows to design the axial extension of the drive sleeve larger than the full open position H of the double seat valve. Through this step the second actuating piston is introduced as near as possible to the third actuating piston, so that the volume of the second pressurizing medium chamber, which is formed within the individual adjustment devices between these two actuating pistons and which produces the first partially open position T1, is minimized.

For easier adjustment of the actuator of the second individual adjustment device, which is designed to implement the partial stroke T2 for the dependently actuated closing element, a different, however above all a relatively low, pressure of the pressurized medium is provided by a further embodiment of the proposed device, that the third actuating piston is fixed, however able to be detached, on its side facing the second actuating piston with a smaller diameter additional piston, that the additional piston working together with a housing ring fixed on the housing of the individual adjustment devices forms a fourth pressurizing medium chamber, which is connected with a third pressurizing medium chamber formed between the third actuating piston and the fourth housing member, and that with the introduction of a third pressurizing medium flow to the third pressurizing medium chamber also an additional force results affecting the additional piston additionally in the fourth pressurizing medium chamber, which superimposes itself additively on the force affecting the third actuating piston. Through the arrangement of an additional piston on the actuating piston of the second individual adjustment device the latter gains a function, which is also often designated as a so-called "batch function". The actuating piston experiences quasi a surface enlargement through the additional piston, which indeed does not have the effect of a larger diameter piston surface by the chosen arrangement, but rather is found in a second, parallel plane. In the present case the pressurizing medium reaches the actuating piston first and afterwards the additional piston, in order to develop each time a force on the respectively arranged pistons through the installed piston surfaces, whereby these two forces, the force on the actuator pistons and the additional force on the additional pistons, are additively superimposed on each other.

A compact arrangement of the second individual adjustment device with additional pistons is attained according to a further proposal, in that the additional piston has a larger diameter external piston section and a smaller diameter interior piston section, that the interior piston section is sealed on the face side against the third actuating piston and screwed to it, that the exterior piston section is sealed on the circumference against the shell of a cylindrical cutout in the housing ring and the interior piston section is sealed on the circumference in a coaxial through-bore in the housing ring, and that in the connection area of the third actuating piston with the additional piston are located in the former a first pressurizing medium channel and in the latter a second pressurizing medium channel, which correspond with one another and connect the third pressurizing medium chamber and the fourth pressurizing medium chamber with one another permeable to the pressurizing medium. The housing ring which is fixed in the housing of the individual adjustment devices forms on the one hand, with the additional pistons, the necessary additional fourth pressurizing medium chamber and creates on the other hand, through its housing side support, the physical conditions for the adding of the additional force to the force on the third actuating piston. The latter, in connection with the fourth housing member, borders the third pressurizing medium chamber, in which the third pressurizing medium flow is first introduced in order to then finally reach into the fourth pressurizing medium chamber.

According to a further advantageous embodiment the housing ring has a radial projection on the circumferential side, with which the housing ring is located form fit to the connection area between the third and the fourth housing member. The assembly of the housing ring is simple under these conditions, since the latter is inserted in the third and the fourth housing member, before these are then integrally joined with one another.

The device according to the invention is designed either with or without additional pistons. Since it is an advantage for the housing of the individual adjustment devices with the pressurizing medium connection which comes into question to always be designed identically regardless of whether an additional piston is present or not, a further embodiment of the proposed device is designed in that a second pressurizing medium connection for a second pressurizing medium flow for pressurization of the second actuating piston which is located in the third housing member discharges into a preceding second pressurizing medium chamber in the area between the third actuating piston and the housing ring, and that the preceding second pressurizing medium chamber is connected with a second pressurizing medium chamber designed between the second actuating piston on the one hand and the housing ring in connection with the additional piston on the other hand, through at least one connection channel, which is located in a cylindrical cutout on the outer peripheral member of the housing ring. Through this arrangement the second pressurizing medium connection can remain at any position in the housing of the individual adjustment devices on which it is located if the second individual adjustment device is not equipped with an additional piston. The connection channel in the housing ring ensures permeability for the pressurizing medium, so that the pressurizing medium introduced through the second pressurizing medium connection can get from one side of the housing ring to its other side below the second actuating piston.

The relatively simply designed total actuating system, which additionally experiences a clear functional separation by its modular design, is also relatively unproblematic in regards to a summation of added process tolerances of its individual members, so far as it effects the ones which are responsible for the second partially open position T2 of the dependently actuated second closing element. This results from the fact that the second closing element in its seat cleaning position opens each time uncritically in the assigned second valve housing member and therefore a danger of collision in the process of the second partially open position T2 does not exist. For this reason the proposed device in this regard is does not require adjustable stops for the limiting of the partial stroke movement of the second closing element in the process of its seat cleaning, rather it is the most simple imaginable end-of-travel limit possible. In this regard the proposal provides that the end-of-travel limit of the third actuating piston for the second partially open position T2 is determined by a stop ring or housing ring permanently located on the housing and axially moveable through the third actuating piston.

In order to fully utilize the advantages of the modular actuator concept, i.e. to be able to use the main adjustment device (as standard actuator alone) and the individual adjustment devices as flexibly as possible, a further proposal allows to design the control rod guided through from the first closing element up through the main adjustment device in several parts, namely in three parts. Here it is provided that the first control rod is screwed using its external threads with a second actuator stem in the area of a second individual adjustment device, that the second actuator stem is also screwed using its external threads with a first actuator stem of the main adjustment device in the area of a first individual adjustment device, and that the screw connection of the actuator stem is securely screwed using a lock nut located on the external threads of the second actuator stem. This arrangement allows the first control rod to also be connected directly with the first actuator stem, if the double seat valve is only to be equipped with a standard actuator. The jam nut prevents that the torque transmitted through the compression of a main spring in the main adjustment device onto the first and the second actuator stem or the first actuator stem and the first control rod loosens the screw connection in question between the respective pairing.

The loosening of the screw connection between the first control rod and the second actuator stem is thus prevented according to a proposal that in the internal threads of the second actuator stem a threaded insert (for example a so-called HeliCoil insert) is provided which works as a screw lock.

The continuous pressurizing medium bore hole in the longitudinal axis of the first actuator stem is advantageously used as a route of transport for the pressurizing medium to the first pressurizing medium chamber, whereby the distribution of the pressurizing medium in this space is done using the respective cross holes.

The housing of the main adjustment and each of the individual adjustment devices can be easily designed with the same diameter since both the full open position H, as well as the first partially open position T1, is directed against the same pretension force of the main spring in the main adjustment device. Thereby it is again possible, as a further proposal provides, to make the housing members of the main adjustment device and those of the individual adjustment devices from housing rough parts of the same shape, whereby a further cost reduction results.

The manufacturing costs can be further reduced in that the housing members of the main adjustment device and those of the individual adjustment device are each integrally joined together, preferably through welding.

In order to reduce costs as well as weight in the proposed device, it is further provided for that the actuating piston of the individual adjustment devices and each of the main adjustment devices are all made of corrosion resistant light alloy, preferably from salt-water proof aluminum.

When disassembling components which are under spring pretension, there is a fundamental safety risk. In order to minimize this safety risk, a further proposal provides that after loosening of the screw connection between the first control rod and the second actuator stem, the pretensioning of the second spring is relieved, which is effective between the second and the third actuator stem.

BRIEF DESCRIPTION OF THE DRAWINGS

Exemplary embodiments of the proposed device for actuating double seat valves according to the invention are represented in the drawing and are described following according to design and function, wherein:

FIG. 6 a middle cross-section through a second embodiment of the individual adjustment devices according to the invention, whereby the third actuating piston is connected with an additional piston and thus the assigned second individual adjustment device supports a so-called "batch function" and FIG. 6a a section from the individual adjustment devices according to FIG. 6 in the area of the screw connection between the third actuating piston and the additional piston.

DETAILED DESCRIPTION

Figure 1:
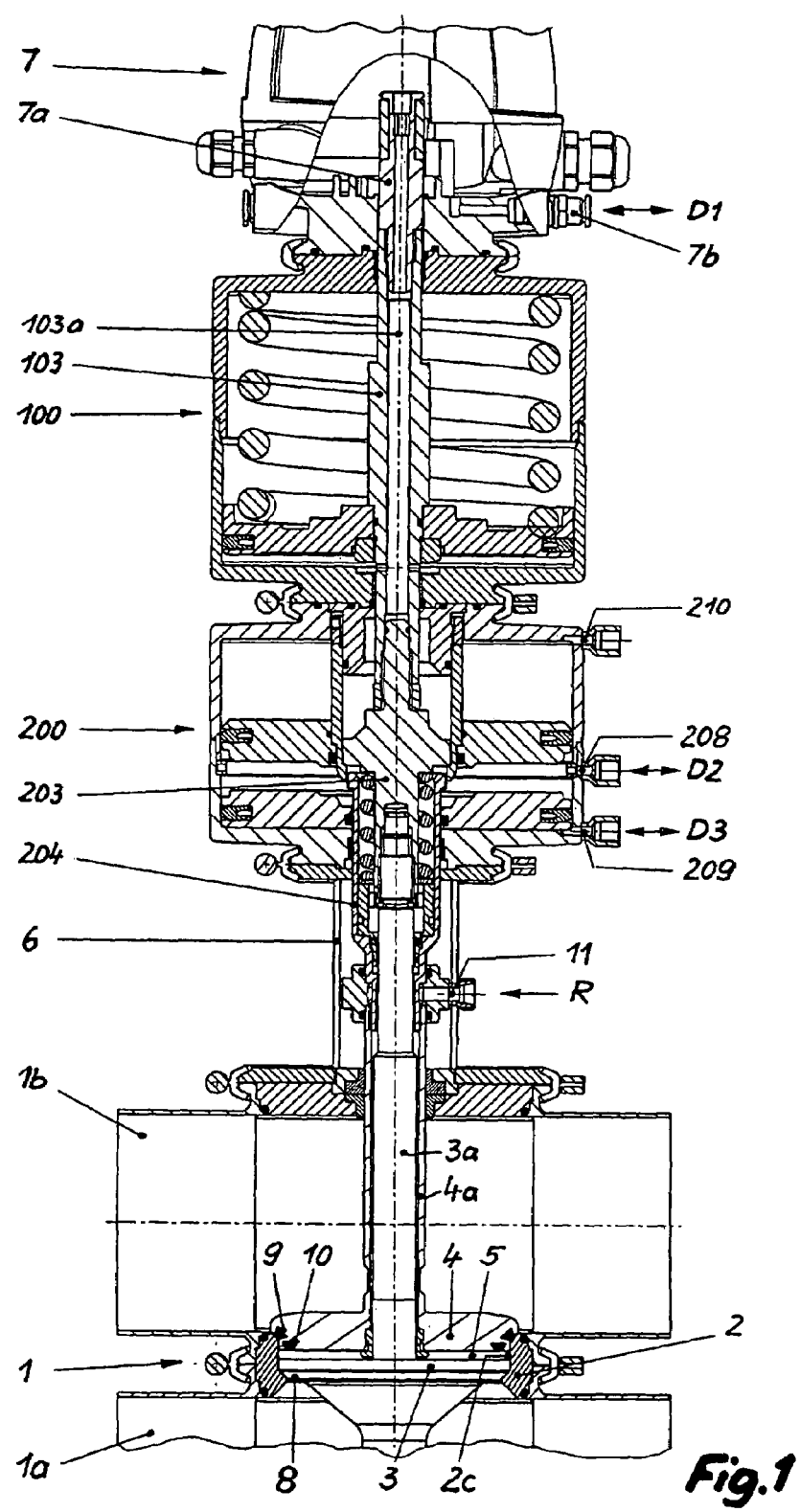
FIG. 1 shows a middle cross-section through a first embodiment of a device for actuating double seat valves of the generic type according to the invention, whereby the referenced double seat valve in the closed position in this reference is located below the proposed device and a control device (in broken-out section) is located above it.

While this invention may be embodied in many different forms, there are described in detail herein a specific preferred embodiment of the invention. This description is an exemplification of the principles of the invention and is not intended to limit the invention to the particular embodiment illustrated The proposed device 100, 200 (FIG. 1) is used for actuating a double seat valve, that is essentially made up of a valve housing 1 with a first and a second valve housing member 1a or 1b, respectively, two closing elements 3 and 4 which are designed as seat discs and move independently to each other using the assigned adjustment rods 3a or 4a, respectively, in each case, a seat ring 2 which makes a connection between the valve housing members 1a, 1b using its inner connection orifice 2c, a lantern housing 6 connecting the second valve housing member 1b with the device 100, 200, as well as a control device 7, whereby the latter is arranged on the side of the device 100, 200 opposite to the double seat valve.

The independently actuated first closing element 3 is equipped with a first seat seal 8 working in the radial as well as in the axial direction, which is assigned a first seat surface 2a (FIG. 2), which is formed from a part on the end side and adjacent to the first valve housing member 1a which borders the connection orifice 2c in the seat ring 2. The dependently actuated second closing element 4 also has in its seat area a second seat seal 9 which works in both the radial and axial direction, and which works together with a second seat surface 2b, which is designed on the other end of the seat ring 2. Between the two closing elements 3, 4 a leakage chamber 5 is formed which, in the full open position H of the double seat valve (FIG. 3), is sealed against its environment by means of a seal 10 working exclusively in the axial direction, which is arranged on the end surface of the second closing element 4 facing the leakage chamber 5.

The leakage chamber 5, as well as the adjacent parts impinged by the flow, can be cleaned in the closed, as well as in the open, position of the double seat valve (see also FIGS. 2, 3 along with FIG. 1) by means of a cleaning solution R which is introduced through a cleaning solution connection 11 which is located in the area of the lantern housing 6 on the second control rod 4a, preferably a non-specified ring channel, between the first and the second control rods 3a, 4a. The removal of this type of "externally" introduced cleaning solution R from the leakage chamber 5 is done here by a non-specified connection line which is arranged in a tubular extension leading through the first valve housing part 1a and out of it on the first closing element 3.

Figure 4:
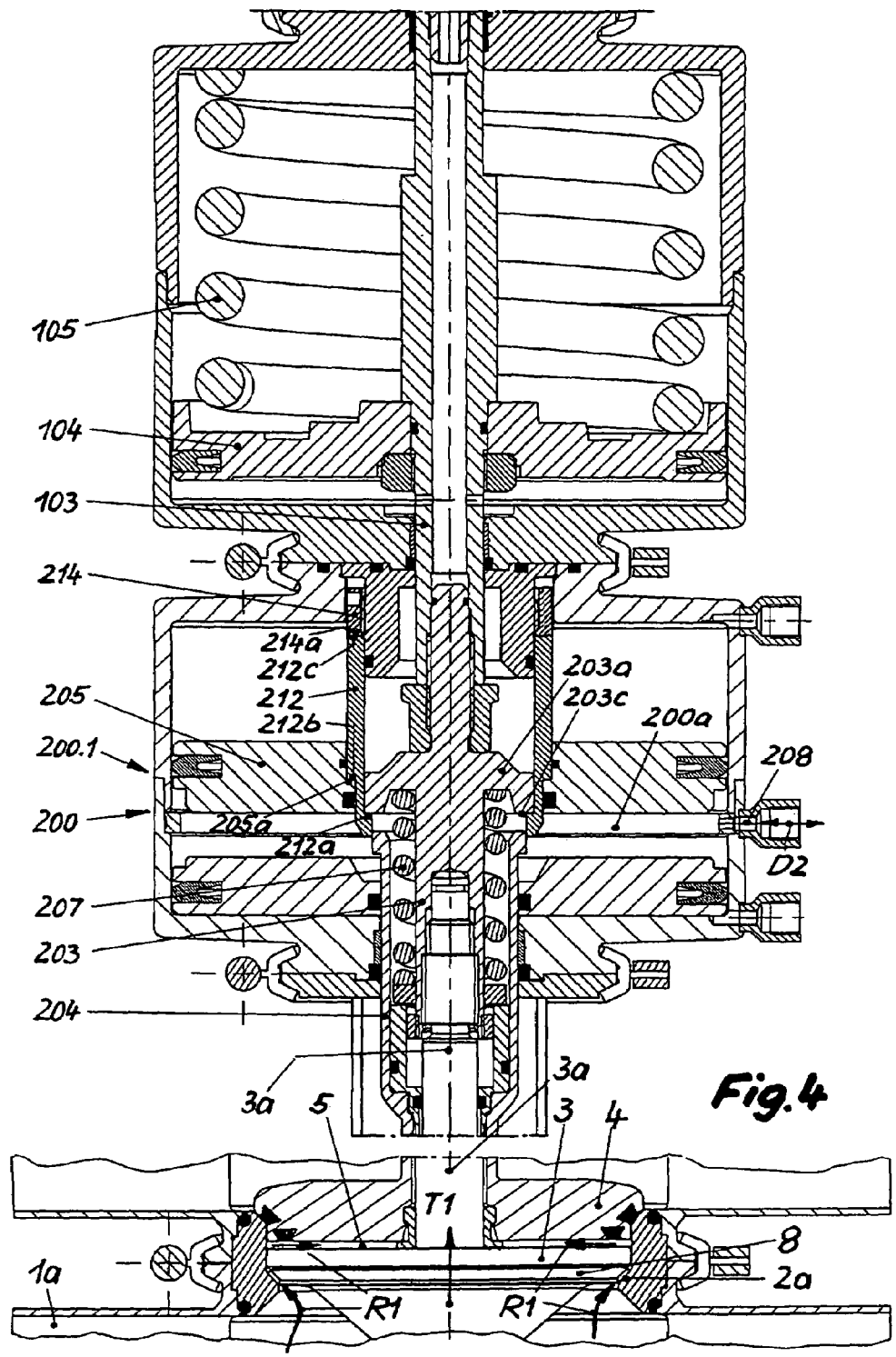
FIG. 4 also shows in middle cross-section the device and both assigned closing elements according to FIG. 2, whereby the parts of the device coming into question henceforth are found in one of the corresponding locations of the seat cleaning positions of the independently actuated first closing element.

The removal of an "internally" introduced cleaning solution by the particular seat cleaning stream R1, R2 from the internal chamber 5, which is introduced from the valve housing part 1a or 1b assigned at any one time during the seat cleaning of the first or the second closing element 3, 4 (also see for this FIGS. 4 and 5), is done in the same manner as with the external cleaning introduction R. In the seat cleaning of the first closing element 3 this is pushed so far in the direction of the second closing element 4 (FIG. 4), that a first partially open position T1 consequently occurs, in which the first seat seal 8 has left the assigned first seat surface 2a gapwise and a first seat cleaning stream R1 from the first valve housing member 1a is generated over the exposed first seat surface 2a in the leakage chamber 5.

For seat cleaning of the second closing element 4 this is pushed so far in the direction of the second valve housing member 1b (FIG. 5), that in a thus partially open position T2 taken from the second closing element 4, the second seat seal 9 left the assigned second seat surface 2b and a second seat cleaning stream R2 from the second valve housing member 1b arrived into the leakage chamber 5 on the way over the exposed seat surface 2b.

To limit the amount of cleaning solution in each of the seat cleaning streams R1, R2 during the process of seat cleaning, known cylindrical projections (not illustrated) are provided on the closing elements 3, 4 if necessary, oriented toward the leakage chamber 5, whereby during gapwise removal of the closing elements 3, 4 from their assigned seat surfaces 2a, 2b the second closing element 4 with its cylindrical projection still reaches sufficiently far with radial clearance into the connection orifice 2c and the first closing element 3 with its cylindrical projection is always provided with radial clearance in the connection orifice 2c and both closing elements 3, 4 in each case form a so-called choking annular gap there with their cylindrical projections. Alternatively the limit of the seat cleaning streams R1, R2 thus are also reached in that the particular partially open position T1, T2 is not stationary generated, but rather oscillating.

To put into effect the preceding briefly illustrated switch movement of the closing elements 3, 4 (full opening stroke H, partially open positions T1 and T2) henceforth the double seat valve is equipped with the device 100, 200 according to the invention, which has the main adjustment device 100 for the opening and closing of the double seat valve within the scope of the full opening stroke H (FIG. 1) and the individual adjustment devices 200 for the generation of the partially open positions T1, T2. The main adjustment device 100 corresponds in its design to a so-called standard actuator, with which a double seat valve of the type in question can be opened and closed on its own; Special functions, such as seat cleaning, cannot be done with this standard actuator. The main adjustment device 100 is designed in a manner in regards to its peripheral housing connections and other necessary connections, so that when eliminating the individual adjustment devices 200 it can be directly connected with a lantern housing 6, which is in fact adjusted in length but is otherwise not modified. The end (external threads) of the first control rod 3a is in this regard designed in such a way, that it is complementary to an end section (internal threads) of a second actuator stem 203 of the individual adjustment device 200, as well as complementary to an end section (internal threads) of a first actuator stem 103 of the main adjustment device 100, which if necessary it is screwed with in each case. The second control rod 4a, continues on above the cleaning solution connection 11 in a third actuator stem 204 designed as a hollow rod and ends in the individual adjustment devices 200.

Because the position of the first closing element 3 must, if necessary, be recorded at each point in time, a position indicator rod 7a is provided, which is screwed with the first actuator stem 103 and ends in the control device 7. For the control of the main adjustment device 100 a first pressurizing medium connection 7b is provided on the control device 7 through which a first pressurizing medium flow D1 is charged or discharged. The latter arrives en route through a pressurizing medium bore hole 103a located in the first actuator stem 103 into the main adjustment device 100. To generate the partially open positions T1, T2 the individual adjustment devices 200 have a second and a third pressurizing medium connection 208, 209 available for the second and third pressurizing medium flow D2, D3. A fourth pressurizing medium connection 210 is closed by means of a non-specified sealing plug and remains without a function in the proposed device.

The housing of the main adjustment device 100 (FIG. 2; the multiplicity of seals of the device are not specified individually here and in further figures) consists of a first and a second housing member 101, 102, which are essentially made from housing rough parts of the same shape. A first actuating piston 104 with piston seal is located on the first actuator stem 103 and fixed there with a non-specified nut. A pretensioned main spring 105 finds its abutment on the one end on the first actuating piston 104 and on the other end on the first housing member 101. After the installation of the first actuating piston 104, the first actuator stem 103 and the main spring 105 in both housing members 101, 102, the latter are preferentially integrally joined together, preferably by welding. The seals and guide bushings in housing 101/102 of the main adjustment device 100 are also exchangeable after their final assembly. The pressurizing medium bore hole 103a located in the first actuator stem 103 and concentric to it is used for the transport of the first pressurizing medium flow D1, which arrives in the first pressurizing medium chamber 100a formed between the first actuating piston 104 and the second housing member 102 through the cross hole 103b.

Below the main adjustment device 100 the individual adjustment devices 200 are additively inserted. The latter, seen from top to bottom, are made up of a first individual adjustment device 200.1 for generation of the first partially open position T1 of the first closing element 3 and by a second individual adjustment device 200.2 for generation of the second partially open position T2 of the second closing element 4. The housings of the individual adjustment devices 200 are formed from a third and a fourth housing member 201, 202, which are made essentially from housing rough parts of the same shape, and after the assembly of the mounting parts are preferentially integrally joined together, preferably by welding.

In the third housing member 201 of the first individual adjustment device 200.1 a peripheral second actuating piston 205 which is provided with a piston seal is located, and below the second actuating piston 205 in the fourth housing member 202 of the second individual adjustment device 200.2 a peripheral third actuating piston 206 which is provided with a piston seal is designed. The latter is supported moveable in the axial direction inside on the third actuator stem 204 which is designed as a hollow rod and is able to be brought with this in the direction of the second partially open position T2 on a shaped recess 204a, formed on the end of the actuator stem 204 in a clamped connection. The second actuating piston 205 penetrates inside through a drive sleeve 212, which has on its end facing the third actuating piston 206 a second recess 212a on the inside and on the outside, an axial distance removed from the latter, a third recess 212b. If necessary the drive sleeve 212 is brought in a clamped connection with the second actuator stem 203 using the second recess 212a, which is expanded in this area in a larger diameter headpiece 203a. The third recess 212b corresponds with a second clamping flat 205a on the second actuating piston 205, so that the latter using a sliding movement carried out in the direction of the first partially open position T1 takes the drive sleeve 212 with it in this direction.

The drive sleeve 212 is supported and sealed on the inside on its end away from the second actuating piston 205 on a guide component 215, which engages from the outside into the third housing member 201, supplements it complementary and is concentrically penetrated inside by the first actuator stem 103. In the area penetrated with the third housing member 201 the guide component 215 is provided with a threaded portion 215a on the outside, on which is screwed a stop nut 214. The latter has on its circumference at least one cutout 214b, with whose help a rotation and therefore axial movement is easily carried out. In addition it is ensured through suitable, not individually specified, steps that the stop nut 214 is immovably fastened in a specific position on the guide component 215 (for example by grub screws). One of the front faces of the stop nut 214 facing the drive sleeve 212 is designed as a fourth stop face 214a, which corresponds with an assigned end surface of the drive sleeve 212, designed as the third stop face 212c. The fourth stop face 214a forms the adjustable stop from outside of the individual adjustment device 200 for the limit of the first partially open position T1 of the first closing element 3.

The access to the stop nut 214 is done in that the clamping ring connection between the main adjustment device 100 and the individual adjustment devices 200 is loosened and the main adjustment device 100 is removed a small distance axially from the individual adjustment device. With this the headpiece 203a comes to rest on the guide component 215, so that with further movements the stop nut 214 leaves the third housing member 201 toward the outside and therefore is accessible from the outside for the purpose of its axial adjustment. Other then the loosening of the existing clamping ring connection this procedure requires no further disassembly of the device, since all the members connected directly or indirectly with the first actuator stem 103 are all extensible from the assembled individual adjustment device 200 in the direction of the main adjustment device 100 flanged to the latter.

The second actuator stem 203 is screwed using an external screw thread with its end facing the main adjustment device 100 and connecting to the expanded headpiece 203a in the area of the first individual adjustment device 200.1 with the first actuator stem 103, whereby this screwed connection is secured by a lock nut 211 located on the external screw thread. In doing so the lock nut 211 comes to rest on the one side at a second stop face 203b of the headpiece 203a and on the other side at an end surface of the first actuator stem 103 designed as a first stop face 103c.

A second pressurizing medium chamber 200a, which is connected with the second pressurizing medium connection 208, is circumferentially encompassed by the housing 201/202 of the individual adjustment devices 200, on one end face by the second actuating piston 205 and on the other end face by the third actuating piston 206. A third pressurizing medium chamber 200b is formed between the third actuating piston 206 and the fourth housing member 202, which is connected with the third pressurizing medium connection 209.

A second spring 207 is located between the headpiece 203a and the third actuator stem 204 in the area of the second individual adjustment device 200.2 within an expansion of the third actuator stem 204 having a hollow rod shaped design, whose pretensioning is measured so that the second closing member 4 is pressed in its closing position with sufficient force on the assigned second seat surface 2b. In the open position of the double seat valve (FIG. 3) the somewhat reduced pretensioning is still sufficient in any case, because of an insignificant elongation of the second spring 207, to press the closing elements 3, 4 together with sufficient force so that the leakage chamber 5 is securely sealed from the surroundings by the seal 10.

Figure 5:
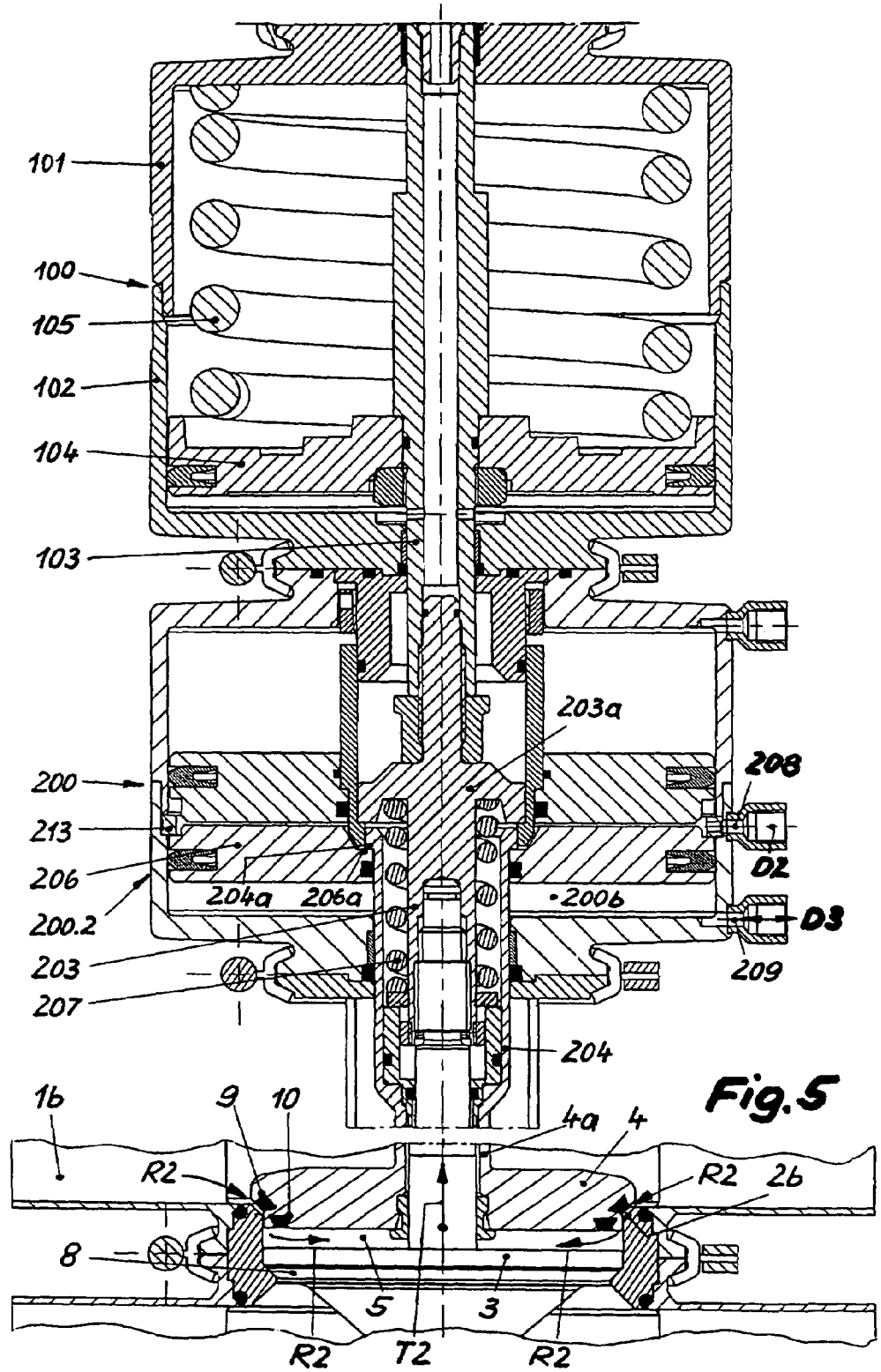
FIG. 5 also shows in middle cross-section the device and both assigned closing elements according to FIG. 2, whereby the parts of the device coming into question henceforth are found in one of the corresponding locations of the seat cleaning positions of the dependently actuated second closing element.

The end-of-travel limit of the third actuating piston 206 for the second partially open position T2 is done by a stop ring 213 axially movable on both sides, which is permanently arranged on housings 201/202 between the actuating pistons 205, 206 (cf. also FIG. 5). The possible travel distance of the third actuating piston 206 to its stop on the stop ring 213 is determined on the exterior by the second partial piston travel b, whereas the third actuating piston 206 can travel in the interior by a third partial piston travel c, which is designed inevitably smaller than the second partial piston travel b, until the third actuating piston 206 ends in the clamping connection with the recess 204a, by means of its third clamping flat 206a. As a result, through the actuation of the third actuating piston 206, a second partially open position T2 results, which is determined (T2=b−c) by the difference [b−c].

Figure 2:
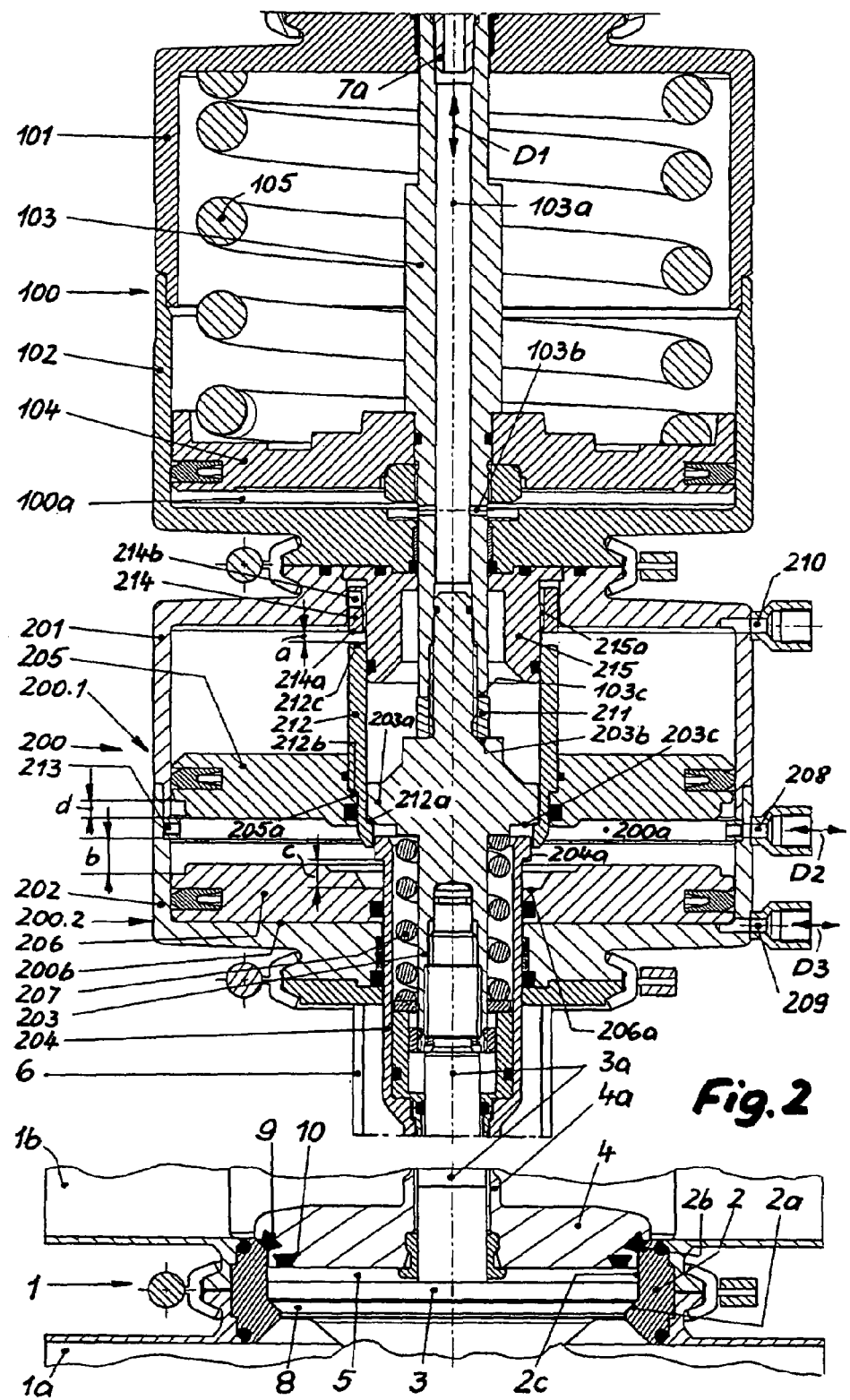
FIG. 2 shows a middle cross-section through the device according to FIG. 1, whereby the illustrated device represents the position of the movement dependent members so that these correspond to the closed position of the two closing elements which are represented in the lower area of the illustration in sections.
Figure 3:
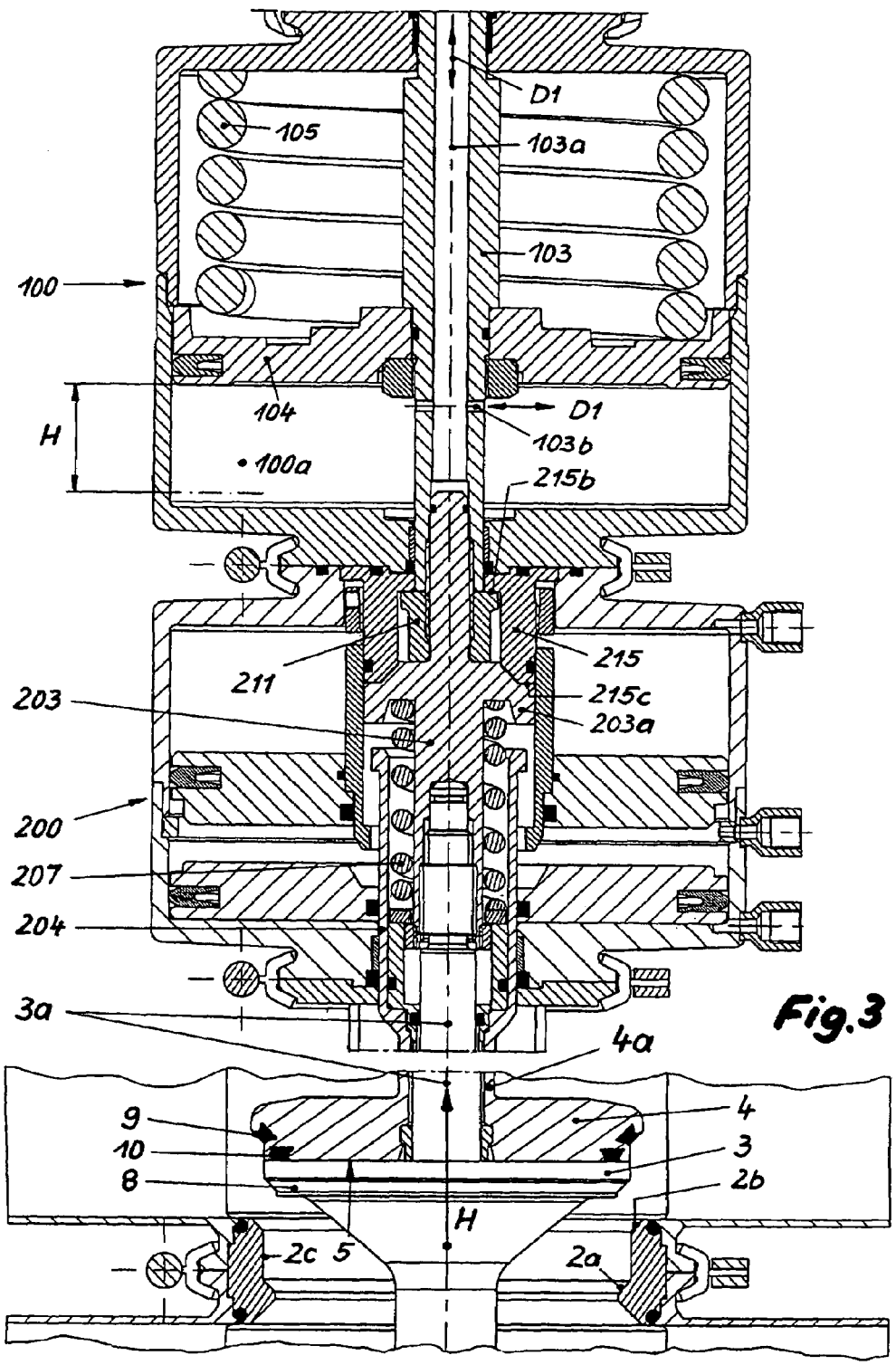
FIG. 3 also shows a device in middle cross-section and both assigned closing elements according to FIG. 2, whereby the members of the device coming into question henceforth are found in one of the corresponding locations of the full open positions of the two closing elements.

The first partially open position T1 results unavoidably from the axial distance between the drive sleeve 212 and the stop nut 214, which in FIG. 2 is marked as the first partial piston travel a, if the headpiece 203a is located in one of the closed positions of the first closing element 3 corresponding locations and using a first clamping flat 203c thus has pushed the drive sleeve 212 over its second recess 212a in an adequate axial position (first partial piston travel a; T1=a). The second actuating piston 205 thereby is likewise correspondingly pushed unavoidably over the third recess 212b of the drive sleeve 212, whereby in this end position it is still an axial safety distance removed, a fourth partial piston travel d, from the stop ring 213. As a rule the second actuating piston 205 would not rest on the stop ring 213, since it is not pressurized from the space between the second actuating piston 205 and the third housing member 201. If however a displacement happens in this regard, then it is ensured in any case that the second actuating piston 205 is lodged on the drive sleeve 212 and remains sealed.

The double seat valve is transported in its full open position H (FIG. 3), if the first pressurizing medium flow D1 of the main adjustment device 100 is introduced through the pressurizing medium bore hole 103a, reaches into the first pressurizing medium chamber 100a through the cross hole 103b and there pressurizes the first actuating piston. The actuating piston 104 pressurized in this manner engages with its opening force, which comes from the pressure in the first pressurizing medium chamber 100a and the provided effective piston surface, directly on the first actuator stem 103 and consequently overcomes the pretensioning force of the main spring 105 and if necessary the aggressive pressure and/or friction forces against the opening movement on both closing elements 3, 4. The latter are additionally to be overcome, since the first actuator stem 103 is connected on the one hand directly with the second actuator stem 203 and this in turn with the first control rod 3a and on the other hand indirectly with the third actuator stem 204 and this in turn with the second control rod 4a. The full open position H finds its end-of-travel limit either through the arrangement of the lock nut 211 on a fifth stop face 215b inside on the guide component 215 or through the arrangement of the headpiece 203a on a sixth stop face 215c outside on the guide component 215.

The seat cleaning of the first closing element 3 (FIG. 4) is done through the introduction of the second pressurizing medium flow D2 in the second pressurizing medium chamber 200a of the first individual adjustment device 200.1 en route over the second pressurizing medium connection 208. Thus the pressurized second actuating piston 205 is pushed in the opening direction of the double seat valve and thus advances using its second clamping flat 205a the drive sleeve 212 over its third recess 212b likewise in the same direction. The drive sleeve 212 comes to rest using its third stop face 212c on the fourth stop face 214a, of the stop nut 214. Simultaneously the second recess 212a engages the headpiece 203a on the first clamping flat 203c on the inside of the drive sleeve 212, so that the second actuator stem 203, and with it the first control rod 3a with the first closing element 3, is pushed in the partially open position T1=a. Thus the assigned first seat surface 2a is gapwise exposed and the first seat cleaning stream R1 reaches out of the first valve housing member 1a en route using the gapwise opened first seat surface 2a into the leakage chamber 5.

The seat cleaning of the second closing element 4 (FIG. 5) is completed in that the third pressurizing medium flow D3 is introduced by the third pressurizing medium connection 209 into the third pressurizing medium chamber 200b of the second individual adjustment device 200.2. Thus the pressurized third actuating piston 206 moves in the direction toward the stop ring 213 and until it gets to its stop there has to overcome the second partial piston travel b (cf. FIG. 2). Beforehand it gets in a clamping connection after the third partial piston travel c via its third clamping flat 206a on recess 204a so that, after a stop on the stop ring 213 from the third actuator stem 204 in connection with the second control rod 4a and thus from the second closing element 4, the required partially open position T2=b−c is completed against the pretension force of the second spring 207. The latter finds an abutment on the headpiece 203a, which via the second actuator stem 203 in connection with the first actuator stem 103 and this in turn in connection with the first actuating piston 104 is fixed securely in this end position by the pretension force of the main spring 105. The second closing element 4 is removed gapwise from its assigned second seat surface 2b through the second partially open position T2, so that the second seat cleaning stream R2 from the second valve housing member 1b reaches over the gap between the exposed second seat surface 2b and the second seat seal 9 into the leakage chamber 5.

In the second individual adjustment device 200.2 inside the individual adjustment devices 200 (FIG. 6), in which the third actuating piston 206 with a so-called "batch function" is provided, the latter is connected tightly, however able to be loosened, on its side facing the second actuating piston 205 with a smaller diameter additional piston 206.1. The additional piston 206.1 working together with a housing ring 213.1 fixed on the housing 201/202 of the individual adjustment device 200 forms a fourth pressurizing medium chamber 200c, which is connected with a third pressurizing medium chamber 200b formed between the third actuating piston 206 and a non-specified bottom member of the fourth housing member 202. At the same time the additional piston 206.1 has a larger diameter exterior piston section 206.1a and a smaller diameter interior piston section 206.1b, whereby the exterior piston section 206.1a features an external diameter $D_a$ and the interior piston section 206.1b an internal diameter $D_i$ (FIG. 6a). The interior piston section 206.1b is sealed on its frontal end by means of seals 218 which are coaxially arranged with each other against the third actuating piston 206 and screwed with this using several of screwed connections 206.2 distributed over its circumference. The exterior piston section 206.1a is peripherally sealed against the shell of a cylindrical recess 213.1a in the housing ring 213.1 by means of a first piston seal 216. In the same manner the interior piston section 206.1b is sealed peripherally in a coaxial through bore 213.1b in the housing ring 213.1 by means of a second piston seal 217. The third pressurizing medium flow D3 is introduced over the third pressurizing medium connection 209 first to the third pressurizing medium chamber 200b. From there the pressurizing medium reaches over a first pressurizing medium channel 200b running between the two seals 218 in an axial direction through the third actuating piston 206, in order to finally reach into a second pressurizing medium channel 206.1d which is running corresponding with these in the additional piston 206.1 up to the fourth pressurizing medium chamber 200c.

The housing ring 213.1 has a radial projection 213.1c on its periphery, with which it is positively fastened in the connection area between the third and the fourth housing member 201, 202. Between the housing ring 213.1 and the third actuating piston 206 a preceding second pressurizing medium chamber 200a* is designed, in which the second pressurizing medium connection 208 discharges. The second pressurizing medium flow D2 is introduced or discharged through the latter-for the execution of the partial stroke movement T1 for the independently actuated closing element 3. The preceding second pressurizing medium chamber 200a* is connected through at least one connection channel 213.1d with the designed second pressurizing medium chamber 200a which is between the second actuating piston 205 on one side and the housing ring 213.1 in connection with the additional piston 206.1 on the other side, which is located in a part of the housing ring 213.1 containing the cylindrical recess 213.1a on the exterior.

The radial projection 213.1c is formed in such a way on its side facing the third actuating piston 206, that the latter, after the completion of the second partial piston travel b (FIG. 6a), experiences there an end-of-travel limit. A corresponding limit of the first partial piston travel a (cf. also FIG. 2) is done by the first individual adjustment device 200.1 (FIG. 6) in that a modified drive sleeve 212* rests on a non-specified stop nut 214 (compare FIG. 2). The synchronization of the modified drive sleeve 212* is implemented, as is already seen from the embodiment of the individual adjustment device 200 according to FIGS. 1 to 5 and as is also hereto described, through the second clamping flat 205a on the second actuating piston 205 working together with the third recess 212b on the modified drive sleeve 212*. The modified drive sleeve 212* via the second recess 212a likewise engages on the non-specified headpiece 203a (compare also FIG. 4) in order to thus move the first closing element 3, the independently actuated closing element, in the course of the first partially open position T1 in one or the other direction. The third actuating piston 206 engages using its third clamping flat 206a on a non-specified first recess 204a (compare also FIG. 5) of the likewise non-specified third actuator stem 204, in order to thus effect the execution of the second partially open position T2 of the second closing element 4 in one or the other direction. The axial extension of the end of the modified drive sleeve 212* facing the third actuating piston makes it necessary to provide the additional piston 206.1 with a coaxial piston bore 206.1c, which surrounds the modified drive sleeve 212* with clearance on the outside.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

REFERENCE NUMBERS OF THE
ABBREVIATIONS USED 1 valve housing
1a first valve housing member
1b second valve housing member
2 seat ring
2a first seat surface
2b second seat surface
2c connection orifice
3 first closing element
3a first control rod
4 second closing element
4a second control rod
5 leakage chamber
6 lantern housing
7 control device
7a position indicator rod
7b first pressurizing medium connection
8 first seat seal (radial, axial)
9 second seat seal (radial, axial)
10 seal (axial)
11 cleaning solution connection
100 main adjustment device
100a first pressurizing medium chamber
101/102 main adjustment device housing
101 first housing member
102 second housing member
103 first actuator stem
103a pressurizing medium bore hole
103b cross holes
103c first stop face
104 first actuating piston
105 main spring
200 individual adjustment device
200.1 first individual adjustment device
200.2 second individual adjustment device
200a second pressurizing medium chamber
200a* preceding second pressurizing medium chamber
200b third pressurizing medium chamber
200c fourth pressurizing medium chamber
201/202 housing of the individual adjustment devices
201 third housing member
202 fourth housing member
203 second actuator stem
203a headpiece 203b second stop face
203c first clamping flat
204 third actuator stem
204a first recess
205 second actuating piston
205a second clamping flat
206 third actuating piston
206a third clamping flat
206b first pressurizing medium channel
206.1 additional piston
206.1a exterior piston section
206.1b interior piston section
206.1c coaxial piston bore
206.1d second pressurizing medium channel
206.2 screwed connection
207 second spring
208 second pressurizing medium connection
209 third pressurizing medium connection
210 fourth pressurizing medium connection
211 lock nut
212 drive sleeve
212* modified drive sleeve
212a second recess
212b third recess
212c third stop face
213 stop ring
213.1 housing ring
213.1a cylindrical cutout
213.1b coaxial through-bore
213.1c radial projection
213.1d connection channel
214 stop nut
214a fourth stop face
214b cutout
215 guide component
215a threaded portion
215b fifth stop face
215c sixth stop face
216 first piston seal
217 second piston seal
218 seal
a first partial piston travel
b second partial piston travel
c third partial piston travel
d fourth partial piston travel
D1 first pressurizing medium flow
D2 second pressurizing medium flow
D3 third pressurizing medium flow
$D_a$ outer diameter
$D_i$ inner diameter
H full opening stroke (full open position)
R cleaning solution
R1 first seat cleaning stream
R2 second seat cleaning stream
T1 first partially open position (T1=a)
T2 second partially open position (T2=b−c)

The invention claimed is:

1. Device for actuating double seat valves, comprising:
two closing elements (3, 4) which are seat discs and move independently to each other,
which enclose between them a leakage chamber (5),
which is connected via at least one path of travel with the surroundings of a double seat valve,
with the independently actuated first closing element (3), that after a partial stroke comes to rest on the dependently actuated second closing element (4) and likewise transfers this with its further opening movement into a full open position (H),
with valve stems (3a, 203, 103; 4a, 204) which fit into one another in a telescoping manner and that extend outward on the side of the second closing element (4) out of a valve housing (1),
through which the closing elements (3, 4), additionally to the full open position (H) and independent of each other, are each able to be brought in a first and second partially open position (T1, T2),
whereby the full open position (H) is generated through a main adjustment device (100) and the first and second partially open positions (T1, T2) through the respective closing elements (3,4) assigned individual adjustment devices (200; 200.1, 200.2),
the individual adjustment devices (200; 200.1, 200.2) are additively inserted between the main adjustment device (100) and the valve housing (1)
and one actuating piston (205, 206 or 206/206.1) is respectively installed on a control rod (3a, 203; 4a, 204), which can be brought axially movable in one direction on the control rod and in the opposite direction for engagement in a clamping connection with this control rod,
and whereby the second partially open position (T2) of the second closing element (4) is limited by a permanent stop position of a third actuating piston (206; 206/206.1) which is provided in the housing (201/202) of the individual adjustment device (200), characterized in that
a stop position of a second actuating piston (205) is relative to the housing (201/202) provided for the first partially open position (T1) of the first closing element (3) and is adjustable from its exterior in the area between the main adjustment device (100) and the individual adjustment devices (200) through a stop nut (214).

2. Device according to claim 1, characterized in that the stop position of the second actuating piston (205) for the first partially open position (T1) is specified indirectly via a drive sleeve (212; 212*), which on the one side is lodged and sealed in the second actuating piston (205) and on the other side on a guide component (215), that as a separate member engages from the outside in the third housing member (201) and complementary supplements it, and whose axial displacement in the direction of the partially open position (T1) is limited by the stop nut (214), which is located on the guide component (215), is accessible from outside and is adjustable and fixable.

3. Device according to claim 2, characterized in that, the axial extension of the drive sleeve (212; 212*) is designed larger than the full open position (H).

4. Device according to claim 1, characterized in that the third actuating piston (206) on its side facing the second actuating piston (205) is connected tightly with a smaller diameter additional piston (206.1), but is able however to be loosened, that the additional piston (206.1) working together with a housing ring (213.1) fixed on the housing (201/202) of the individual adjustment device (200) forms a fourth pressurizing medium chamber (200c), which is connected with a third pressurizing medium chamber (200b) formed between the third actuating piston (206) and the fourth housing member (202), and that with the introduction of a third pressurizing medium flow (D3) to the third pressurizing medium chamber (200b) also an auxiliary force affecting the additional piston (206.1) results additionally in the fourth pressurizing medium chamber (200c, which additively superimposes on the force affecting the third actuating piston (206).

5. Device according to claim 4, characterized in that the additional piston (206.1) has a larger diameter exterior piston section (206.1a) and a smaller diameter interior piston section (206.1b), that the interior piston section (206.1b) is sealed on its frontal end from the third actuating piston (206) and is screwed with this, that the exterior piston section (206.1a) is sealed on its periphery from the shell of a cylindrical cutout (213.1a) in the housing ring (213.1) and the interior piston section (206.1b) is sealed on its periphery in a coaxial through bore (213.1b) in the housing ring (213.1), and that in the connection area of the third actuating piston (206) with the additional piston (206.1) are located in the former a first pressurizing medium channel (206b) and in the latter a second pressurizing medium channel (206.1d), which correspond with one another and connect the third pressurizing medium chamber (200b) and the fourth pressurizing medium chamber (200c) with one another permeable to the pressurizing medium.

6. Device according to claim 4, characterized in that the housing ring (213.1) has a radial projection (213.1c) on its circumference, with which the housing ring (213.1) is positively fastened in the connection area between the third and the fourth housing member (201, 202).

7. Device according to claim 4, characterized in that a second pressurizing medium connection (208) for a second pressurizing medium flow (D2) for pressurizing of the second actuating piston (205) located in the third housing member (201) discharges in a preceding second pressurizing medium chamber (200a*) in the area between the third actuating piston (206) and the housing ring (213.1), and that the preceding second pressurizing medium chamber (200a*) is connected with a second pressurizing medium chamber (200a) formed between the second actuating piston (205) on one side and the housing ring (213.1) in connection with the additional piston (206.1) on the other side through at least one connection channel (213.1d), which is located in a part of the housing ring (213.1) containing the cylindrical cutout (213.1a) on the exterior.

8. Device according to claim 1, characterized in that the stop position of the third actuating piston (206; 206/206.1) for the second partially open position (T2) is determined by a stop ring or housing ring (213; 213.1), which is permanently located on a housing (201/202) and is axially moveable through the third actuating piston (206; 206/206.1).

9. Device according to claim 1, characterized in that the first control rod (3a) is screwed with its external threads with a second actuator stem (203) in the area of a second individual adjustment device (200.2), that the second actuator stem (203) is screwed with its external threads likewise with a first actuator stem (103) of the main adjustment device (100) in the area of a first individual adjustment device (200.1), and that the screwed connection of the actuator sterns (103, 203) are secured firmly by a lock nut (211) located on the external threads of the second actuator stem (203).

10. Device according to claim 9, characterized in that the screwed connection of the first control rod (3a) with the second actuator stem (203) is secured against loosening by a threaded section, acting as a screw lock, located in the internal threads of the second actuator stem (203).

11. Device according to claim 9, characterized in that the first actuator stem (103) is provided with a continuous pressurizing medium bore hole (103a) in its longitudinal axis, which leads over cross holes (103b) into a first pressurizing medium chamber (100a) of the main adjustment device (100).

12. Device according to claim 1, characterized in that the housing members (101, 102) of the main adjustment device (100) and each (201, 202) of the individual adjustment devices (200) are made from housing rough parts of the same shape.

13. Device according to claim 1, characterized in that the housing member (101, 102) of the main adjustment device (100) and each (201, 202) of the individual adjustment devices (200) are each integrally joined with each other.

14. Device according to claim 1, characterized in that the actuating pistons (205, 206; 206/206.1) and an actuating piston (104) of the main adjustment device (100) each are made out of corrosion resistant light alloy.

15. Device according to claim 1, characterized in that the following arrangement, made up of a guide component (215) in connection with the stop nut (214), the drive sleeve (212), the second actuator stem (203) in connection with the lock nut (211), a third actuator stem (204) and a second spring (207) located between the latter and the second actuator stem (203), is totally extendable out of the assembled individual adjustment devices (200) in the direction of the main adjustment device (100) flanged on the latter.

16. Device according to claim 1, characterized in that after loosening the screw connection between the first control rod (3a) and the second actuator stem (203) the pretensioning of the second spring (207) is relieved.

* * * * *